(12) United States Patent
Thakkar et al.

(10) Patent No.: US 11,842,180 B2
(45) Date of Patent: Dec. 12, 2023

(54) FRAMEWORK FOR CODES AS A SERVICE MANAGEMENT AND DEPLOYMENT

(71) Applicant: Dell Products L.P., Round Rock, TX (US)

(72) Inventors: Jatin Thakkar, Bengaluru (IN); Manikandan Pammal Rathinavelu, Leander, TX (US); Pradeepta Ranjan Choudhury, Angul (IN); Matthew C. Frank, Round Rock, TX (US); Sabu K. Syed, Austin, TX (US); Adam Mahram, Coral Springs, FL (US); Khadeer Ahmed Shaikh, Round Rock, TX (US); Tarun Gupta, Bangalore (IN); Sejal Mohata, East Delhi (IN); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 167 days.

(21) Appl. No.: 17/576,472

(22) Filed: Jan. 14, 2022

(65) Prior Publication Data

US 2023/0229411 A1    Jul. 20, 2023

(51) Int. Cl.
| | |
|---|---|
| G06F 11/36 | (2006.01) |
| G06N 3/04 | (2023.01) |
| G06F 9/455 | (2018.01) |
| G06F 8/41 | (2018.01) |
| G06F 9/445 | (2018.01) |
| G06F 8/60 | (2018.01) |
| G06F 11/34 | (2006.01) |
| G06N 20/00 | (2019.01) |

(52) U.S. Cl.
CPC ............ *G06F 8/60* (2013.01); *G06F 11/3476* (2013.01); *G06N 20/00* (2019.01)

(58) Field of Classification Search
CPC .......... G06N 5/048; G06N 20/00; G06N 3/08; G06N 3/044; G06N 3/084; G06N 3/045; G06N 3/088; G06F 8/60; G06F 11/3476; G06F 11/362; G06F 11/3604; G06F 11/3616; G06F 11/3664
See application file for complete search history.

(56) References Cited

U.S. PATENT DOCUMENTS 11,175,897 B1 * 11/2021 Deng ..................... G06F 8/51
11,604,719 B2 * 3/2023 Clement ............ G06F 11/3636

OTHER PUBLICATIONS

Wikipedia, "Interquartile Range," https://en.wikipedia.org/w/index.php?title=Interquartile_range&oldid=1064029581, Jan. 6, 2022, 5 pages.

(Continued)

*Primary Examiner* — Thuy Dao
(74) *Attorney, Agent, or Firm* — Ryan, Mason & Lewis, LLP

(57) ABSTRACT

A method comprises receiving data corresponding to execution of one or more applications, accessing at least one function from a codes as a service source, and training the at least one function based, at least in part, on one or more parameters, wherein the training is performed using a first portion of the data. In the method, a deployment version of the at least one function is generated based, at least in part, on the training, and the deployment version of the at least one function is applied to a second portion of the data to perform at least one service.

20 Claims, 12 Drawing Sheets

(56) References Cited

OTHER PUBLICATIONS

Wikipedia, "Artificial Intelligence for IT Operations," https://en.wikipedia.org/w/index.php?title=Artificial_Intelligence_for_IT_Operations&oldid=1056591840, Nov. 22, 2021, 3 pages.
Wikipedia, "DBSCAN," https://en.wikipedia.org/w/index.php?title=DBSCAN&oldid=1043021240, Sep. 7, 2021, 8 pages.
Appdynamics, "What is AIOps?" https://www.appdynamics.com/topics/what-is-ai-ops, Accessed Jan. 13, 2022, 6 pages.

* cited by examiner

300

IMPORT THE REQUIRED FUNCTION

```
In [ ]:    # for missing values treatment
           from missing_data_treatment import missing_data_treatment
           # for implementation Dynamic Anomaly Detection module process flow
           from dynamic_anomaly_detection import dynamic_anomaly_detection
```

RUN TRAINING PROCESS

```
In [ ]:    # check missing values
           df = missing_data_treatment(path=r"C:\Users\ABCDEFG123\OPS\AIOps\VM_alerts\Anomaly Detection",
                                        df_name="cpu_pc_1.csv",
                                        version="V1.cpu")

# Apply Dynamic Anomaly Detection
           df = dynamic_anomaly_detection(path=r"C:\Users\ABCDEFG123\OPS\AIOps\VM_alerts\Anomaly Detection",
                                           df_name="cpu_pc_1.csv",
                                           version="V1.cpu")
```

DEPLOY IDENTIFIED VERSION

```
In [ ]:    # Apply Dynamic Anomaly Detection
           df = dynamic_anomaly_detection(path=r"C:\Users\ABCDEFG123\OPS\AIOps\VM_alerts\Anomaly Detection",
                                           df_name="cpu_pc_test.csv",
                                           version="V1.cpu",
                                           scoring="Y",
                                           pipeline_object="cpu_pc_1.csv_dynamic_anomaly_detection_V1.cpu_steps.ob",
                                           obs_and_pred_folder="dynamic_anomaly_detection_V1.cpu")
```

FIG. 3

```
----- Anomaly Detection Report ------
----------------------------------------
                                                                    400

Maximum threshold breach report:
(84.72% / 2 instances noted as anomaly)
            Date           Reference  cpu_utilization_perc
@ 2021-09-14 00:00:00-05:00 adiplastico        100.0

Expected_max_value  Abs_diff       outlier_type
      36.005         63.995     max_threshold_breach
```

```
identify column that represents date-time information: _time
identify column of interest for anomaly detection: cpu_utilization_perc date range for _time:
2021-09-13 00:00:00-05:00
2021-09-14 00:00:00-05:00 at what level should the anomalies be detected?
hourly/daily: daily
consider day of the week for experiment?
daily/max: 34
how many weeks to be considered to learn trends? 2
which column categorizes the information into different groups (input na if not applicable) host store aes for correlation study (corr/na)? corr set IQR multiplier factor for identifying box-plot anomalies (float)? 1
select type of anomalies to be identified (min/max/both) max
...generating anomaly boundaries for reference....

assign static thresholds to regulate noisy alerts (float value/na)? 75
```

FIG. 6A

```
# Reading experiments steps for implementation during scoring
# These steps are curated based on SME inputs to capture business context
import pickle
with open("cpu_pc_1_cpu_dynamic_anomaly_detection_v1_cpu_steps.ob", "rb") as fp:
    inputs = pickle.load(fp)
print(inputs)

[('time', 'cpu_utilization_perc', 'daily', 'NA', '2', 'host', 'corr', '1', 'max', '75')]
```

```
# Automation of ETL scripts and storing only processed datasets
#to compress data storage volume
import pandas as pd
df_raw = pd.read_csv("automated_raw_data_forwarders.csv")
print("RAW DATA:")
print(df_raw.info())

print("HISTORICAL DATA STORED (with business context):")
df_ADS = pd.read_csv("memUsedPct_Correlation_ADS_09_17_2021.csv")
print(df_ADS.info())
```

RAW DATA:
<class 'pandas.core.frame.DataFrame'>
RangeIndex: 26124 entries, 0 to 26123
Data columns (total 3 columns):
 #   Column                 Non-Null Count  Dtype
---  ------                 --------------  -----
 0   _time                  26124 non-null  object
 1   host                   26124 non-null  object
 2   cpu_utilization_perc   26124 non-null  float64
dtypes: float64(1), object(2)
memory usage: 612.4+ KB
None
HISTORICAL DATA STORED (with business context):
<class 'pandas.core.frame.DataFrame'>
RangeIndex: 142 entries, 0 to 141
Data columns (total 3 columns):
 #   Column      Non-Null Count  Dtype
---  ------      --------------  -----
 0   _time       142 non-null    object
 1   host        142 non-null    object
 2   memUsedPct  142 non-null    float64
dtypes: float64(1), object(2)
memory usage: 3.5+ KB
None

FIG. 7

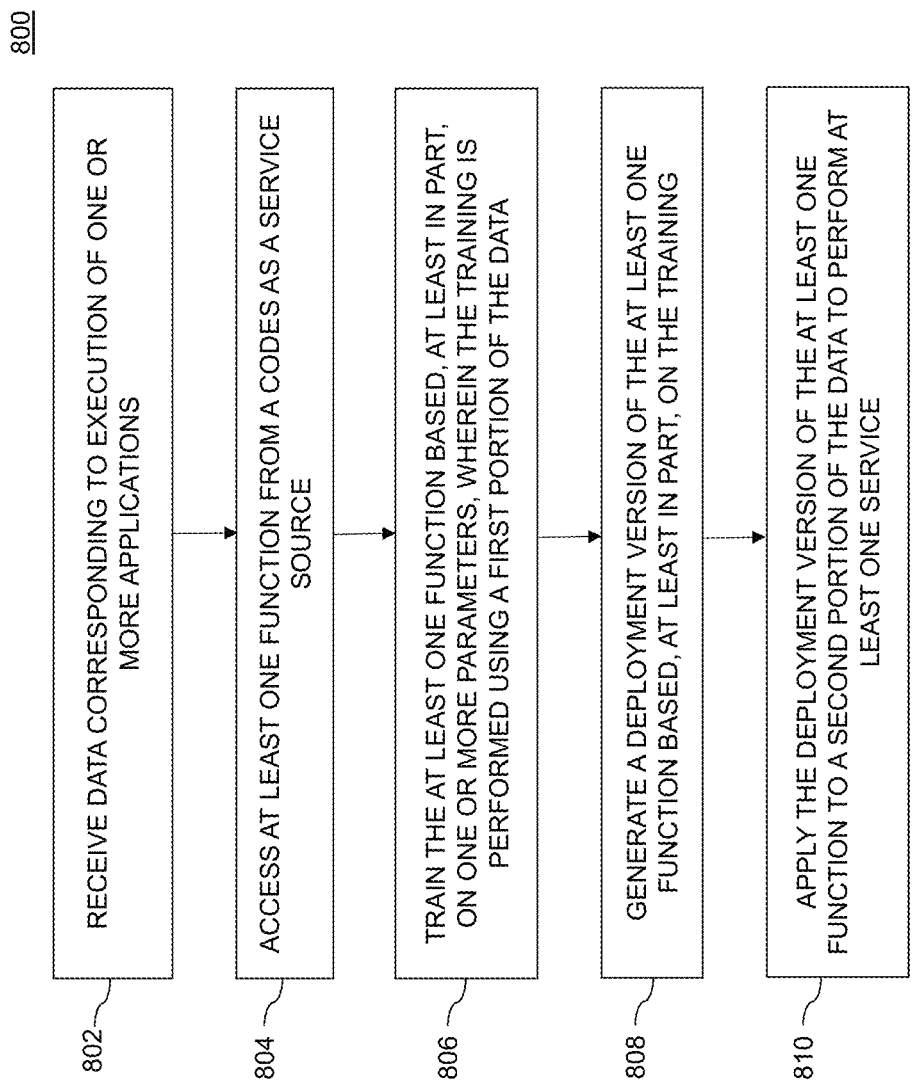

FRAMEWORK FOR CODES AS A SERVICE MANAGEMENT AND DEPLOYMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to management and deployment of codes as a service.

BACKGROUND

Artificial intelligence for information technology (IT) operations (AIOps) refers to an industry category for machine learning analytics that enhances IT operations analytics. Although many organizations have already implemented AIOps solutions, it is often necessary to ensure that the following capabilities are provided to artificial intelligence engineers and statisticians while building AIOps solutions: (i) clarity of AIOps goals and milestones; (ii) availability of required infrastructure (e.g., storage, computing and automation devices); and (iii) optimum utilization of machine learning across varied algorithms and methodologies.

SUMMARY

Embodiments provide a framework for management and deployment of codes as a service.

For example, in one embodiment, a method comprises receiving data corresponding to execution of one or more applications, accessing at least one function from a codes as a service source, and training the at least one function based, at least in part, on one or more parameters, wherein the training is performed using a first portion of the data. In the method, a deployment version of the at least one function is generated based, at least in part, on the training, and the deployment version of the at least one function is applied to a second portion of the data to perform at least one service.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 depicts example pseudocode corresponding to training and deployment of code in an ML-CaaS framework in an illustrative embodiment.

FIG. 4 depicts an anomaly detection report in an illustrative embodiment.

FIG. 6A depicts example queries and user responses utilized in connection with training and deployment of code in an ML-CaaS framework in an illustrative embodiment.

FIG. 6B depicts example pseudocode for storage of the user responses from FIG. 6A for future use in an illustrative embodiment.

FIG. 7 depicts example pseudocode for storage reduction and results of application of the pseudocode in an illustrative embodiment.

FIG. 8 depicts a process for management and deployment of codes as a service according to an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Figure 1:
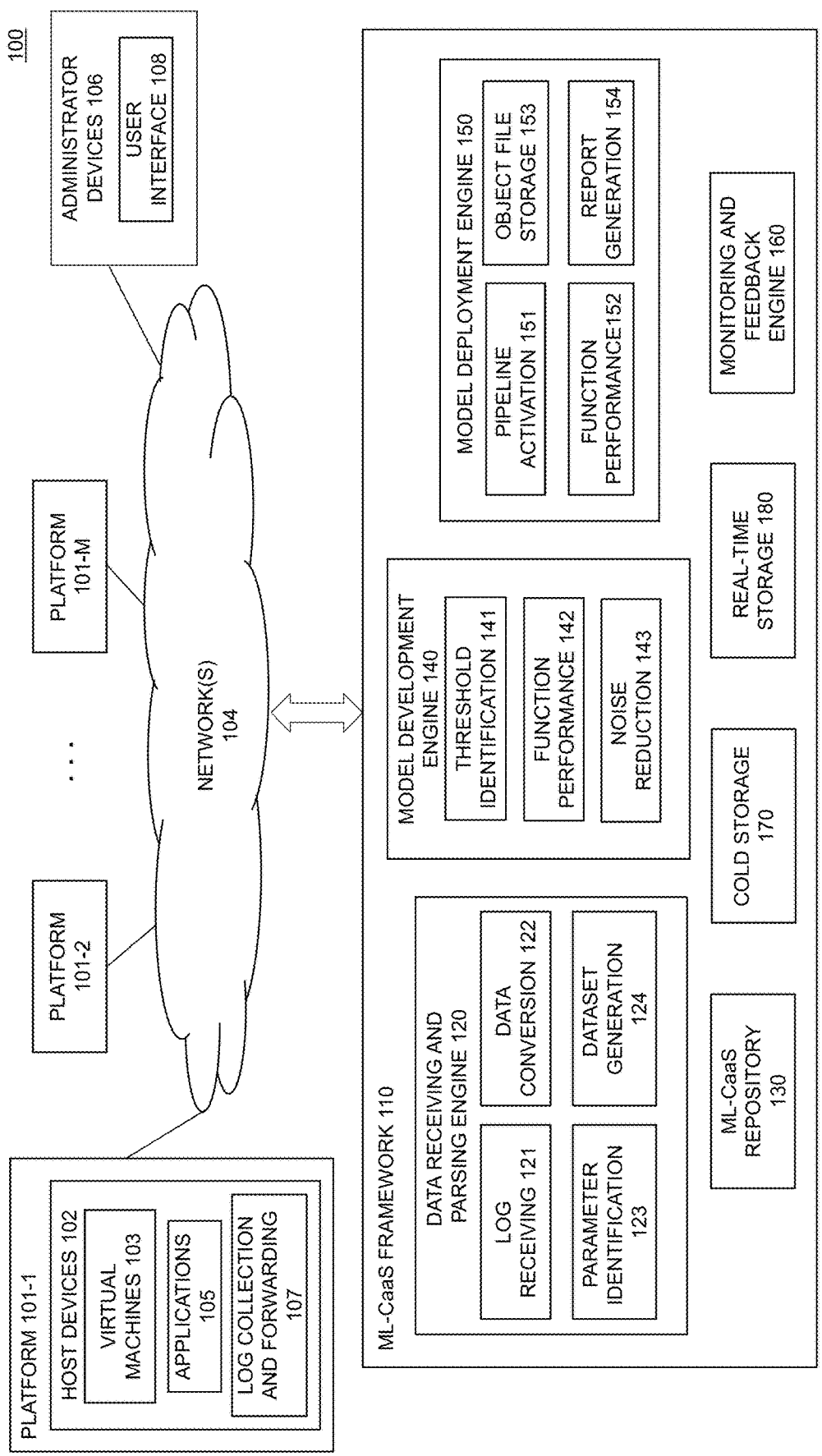
FIG. 1 depicts an information processing system with a machine learning codes as a service (ML-CaaS) framework in an illustrative embodiment.

FIG. 1 shows an information processing system 100 configured in accordance with an illustrative embodiment. The information processing system 100 comprises platforms 101-1, 101-2, . . . 101-M (collectively "platforms 101"). Each platform 101 comprises one or more host devices 102. Respective ones of the host devices 102 comprise, for example, one or more virtual machines (VMs) 103, one or more applications 105 running on the host devices 102, and at least one log collection and forwarding module 107. The information processing system 100 further comprises one or more administrator devices 106, which may be used by, for example, data scientists and/or subject matter experts (SMEs). The administrator devices 106 respectively comprise one or more user interfaces 108. The platforms 101 including the host devices 102 and the administrator devices 106 communicate over a network 104 with an ML-CaaS framework 110. The variable M and other similar index variables herein such as K and L are assumed to be arbitrary positive integers greater than or equal to two.

The host devices 102 and administrator devices 106 can comprise, for example, Internet of Things (IoT) devices, desktop, laptop or tablet computers, mobile telephones, or other types of processing devices capable of communicating with the ML-CaaS framework 110 over the network 104. Such devices are examples of what are more generally referred to herein as "processing devices." Some of these processing devices are also generally referred to herein as "computers." The host devices 102 and administrator devices 106 may also or alternately comprise virtualized computing resources, such as VMs (e.g., VMs 103), containers, etc. The host devices 102 and/or administrator devices 106 in some embodiments comprise respective computers associated with a particular company, organization or other enterprise.

The terms "user" or "administrator" herein are intended to be broadly construed so as to encompass numerous arrangements of human, hardware, software or firmware entities, as well as combinations of such entities. Codes as a service management and deployment services may be provided for users utilizing one or more machine learning models, although it is to be appreciated that other types of infrastructure arrangements could be used. At least a portion of the available services and functionalities provided by the ML-CaaS framework 110 in some embodiments may be provided under or in conjunction with Function-as-a-Service ("FaaS") and/or Platform-as-a-Service ("PaaS") models, including cloud-based FaaS and PaaS environments.

Although not explicitly shown in FIG. 1, one or more input-output devices such as keyboards, displays or other types of input-output devices may be used to support one or more user interfaces to the ML-CaaS framework 110 (e.g., user interfaces 108), as well as to support communication between the ML-CaaS framework 110 and connected devices (e.g., host devices 102 and administrator devices 106) and/or other related systems and devices not explicitly shown.

In some embodiments, the administrator devices 106 are assumed to be associated with repair technicians, system administrators, information technology (IT) managers, software developers, release management personnel, data scientists, SMEs or other authorized personnel configured to access and utilize the ML-CaaS framework 110.

The embodiments advantageously provide a ready-to-use ML-CaaS framework 110 for use in connection with a plurality of services. For example, one or more embodiments implement dynamic anomaly detection through machine learning based analysis of application and platform logs. Dynamic anomaly detection enables efficient parsing of anomalous behavior found in various application and platform logs analyzed during AIOps implementations. Unlike conventional approaches, which are reactive in nature, the embodiments proactively identify anomalies in logs based on thresholds learned from user-defined historical datasets.

As an additional advantage, historical data storage requirements are reduced, and significant savings in terms of storage and time are realized due to a high volume unstructured logs being stored only during a data manipulation lifecycle. The embodiments further provide an intelligent alerting mechanism, which uses one or more noise reduction techniques described herein to reduce a number of alerts.

The ML-CaaS framework 110 in an embodiment is assumed to be accessible to the platforms 101, host devices 102 and/or administrator devices 106 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the ML-CaaS framework 110 includes a data receiving and parsing engine 120, an ML-CaaS repository 130, a model development engine 140, a model deployment engine 150, a monitoring and feedback engine 160, a cold storage component 170 and a real-time storage component 180. The data receiving and parsing engine 120 includes a log receiving layer 121, a data conversion layer 122, a parameter identification layer 123 and a dataset generation layer 124. The model development engine 140 includes a threshold identification layer 141, a function performance layer 142 and a noise reduction layer 143. The model deployment engine 150 includes a pipeline activation layer 151, a function performance layer 152, an object file storage layer 153 and a report generation layer 154.

Figure 5A:
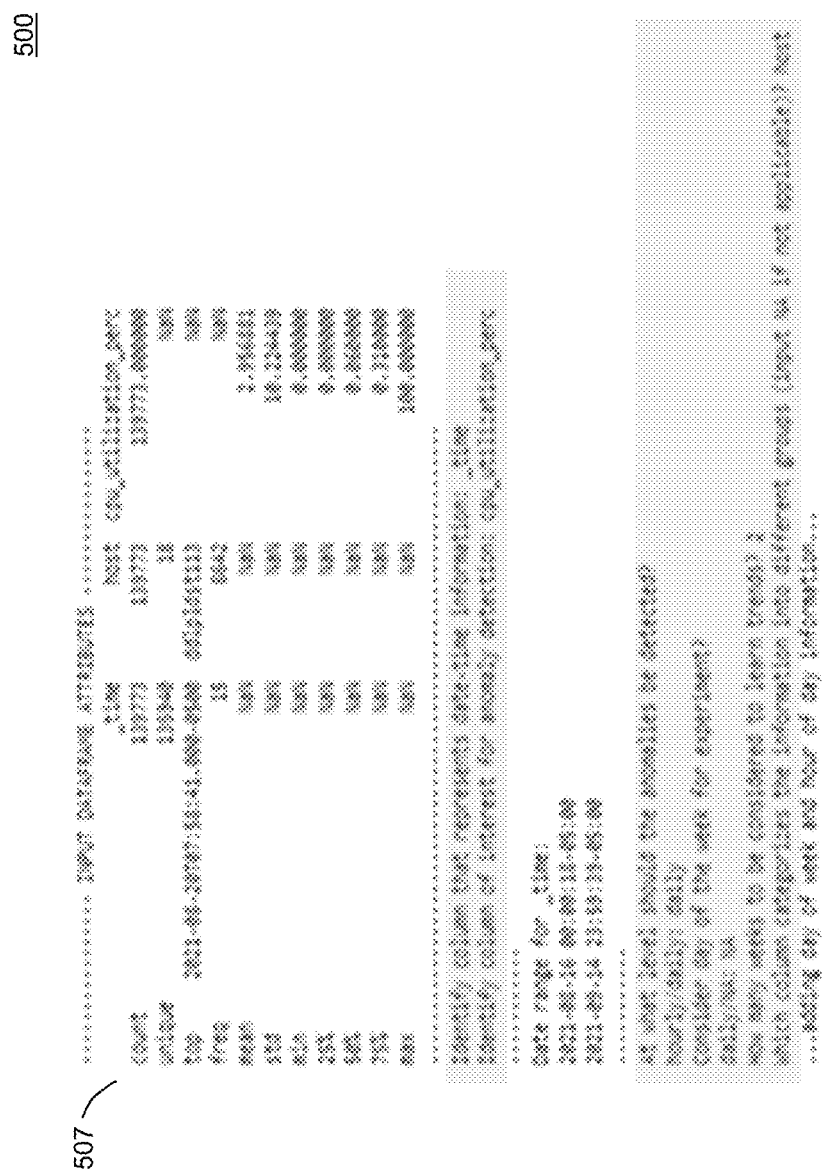
FIGS. 5A and 5B depict example queries and user responses utilized in connection with training and deployment of code in an ML-CaaS framework in an illustrative embodiment.

The log receiving layer 121 of the data receiving and parsing engine 120 receives log data associated with the operation of platforms 101 from the log collection and forwarding modules 107 of the host devices 102. For example, the logs may comprise data corresponding to the execution of one or more of the applications 105 running on the host devices 102 of the platforms 101. FIGS. 5A and 7 include some non-limiting examples of log data 507 and 707.

According to an embodiment, based on received parameters, the parameter identification layer 123 of the data receiving and parsing engine 120 identifies one or more parameters to be used in connection with training and/or deployment of a function from the ML-CaaS repository 130 or other codes as a service source. According to an embodiment, the parameters are received from an administrator or other user via a user interface 108 on an administrator device 106. For example, referring to the example queries and user responses 500, 510 and 600 in FIGS. 5A, 5B and 6A in connection with dynamic anomaly detection, a user may be asked to identify one or more columns of log data (e.g., log data 507) that represent date-time information, and to identify a column of interest in the log data for anomaly detection. As can be seen in FIGS. 5A and 6A, in connection with the log data 507, the date-time information is in the column "time" and the column of interest for anomaly detection is "cpu_utilization_perc" corresponding to detection of anomalies in connection with CPU utilization.

Figure 5B:
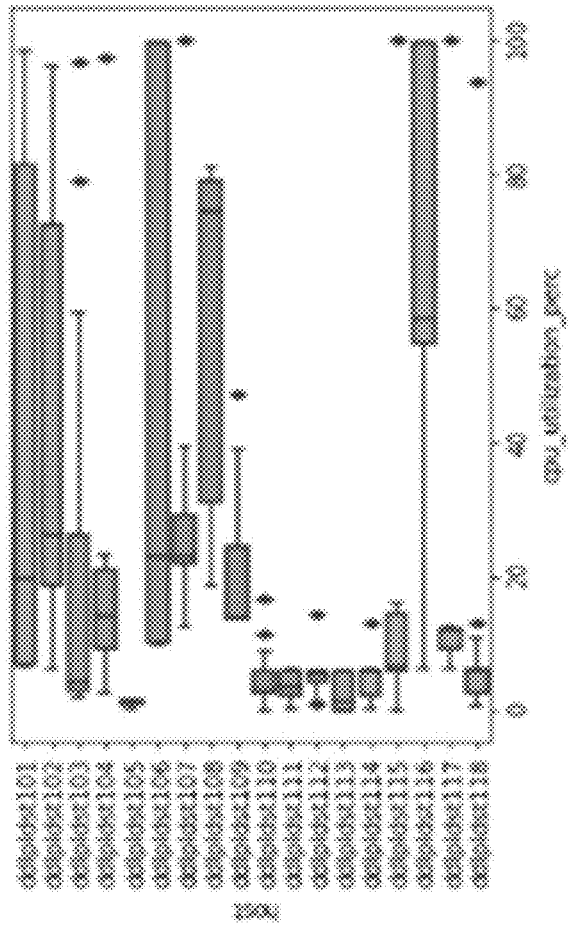

As shown in FIGS. 5A, 5B and 6A, other parameters include, but are not necessarily limited to: (i) anomaly detection frequency (e.g., hourly, daily, specific minute interval, etc.); (ii) an optional particular time period (e.g., day of the week/hour of the day) to capture seasonality trends (e.g., as recommended by the SMEs); (iii) a selected amount of history to be considered for threshold training (e.g., 2 weeks of data); (iv) an identification of grouping variables (e.g., host device, "host" column of log data 507) to define context; (v) optional comparison of multiple logs at the same or similar level across applications 105 and platforms 101 for correlation and other studies covered in ML-CaaS modules (referring, for example, to the example queries and user responses 510 and 600 in FIGS. 5B and 6A, an analytical data site (ADS) may be stored for a correlation study); and (vi) parameters for outlier detection depending on the anomaly detection technique used (e.g., in an embodiment, identified interquartile range (IQR) multipliers for the generation of variable whiskers based on an IQR based box plot outlier detection technique).

The column of interest for anomaly detection may indicate other different metrics of interest that may relate to anomaly detection, such as, for example, error count, input-outputs per second (IOPS), latency, throughput, data transfer rates or other metrics (e.g., key performance indicators (KPIs) related to the proper execution of an application).

The selected amount of history to be considered for threshold training limits what portion of the data is be used for the training of the ML-CaaS functions. For example, by enabling specification of the time intervals to which the data corresponds, the embodiments provide flexibility to consider, for example, recent history in the case of relatively volatile applications or long term history in the case of relatively stable applications.

The identification of grouping variables permits granularity specifications to define, for example, business or other enterprise contexts. For example, there may be certain applications, devices or other technologies that need to be analyzed in connection with a particular context.

The data conversion layer 122 converts the raw log data from an unstructured format to a structured format so that the data can be analyzed by the model development and model deployment engines 140 and 150. For example, the specified anomaly detection frequency (e.g., hourly, daily, specific minute interval) is used for grouping the log data. Understanding that not all logs collect data at the same time, the log data can be grouped, for example, according to when the data was collected (e.g., group logs occurring within a 5-minute period or other time period).

Based on the identified parameters, the dataset generation layer 124 of the data receiving and parsing engine 120 generates required training and prediction datasets from, for example, log data in the cold storage component 170, whereby the data conversion layer 122 processes raw logs into structured timeseries datasets. As noted above, the datasets may be limited based on, for example, time constraints and metrics of interest, and grouped according to one or more conditions.

According to an embodiment, the model development engine 140 accesses a relevant function from a codes as a service source (e.g., the ML-CaaS repository 130) and trains the function based on the parameters and using a portion of the log data in the generated datasets. In this operational example, the relevant function comprises ML-CaaS code directed to dynamic anomaly detection for which a refined deployment version of the code is sought. Although the embodiments are described in connection with an operational example where ML-CaaS functions perform dynamic anomaly detection, the embodiments are not necessarily limited thereto, and may be applicable to other functions available from a codes as a service platform. Such other functions may include, but are not necessarily limited to, missing data treatment, numeric variables treatment, object variables treatment, text data preparation, principal component analysis (PCA) implementation, data clustering, data classification, data wrangling, exploratory data analysis (EDA)/data visualization, outliers treatment, data transformations, regression, time-series analysis, recommendations, reinforcement learning and chatbot functionality.

In connection with training relevant ML-CaaS functions, the threshold identification layer 141 and the noise reduction layer 143 respectively identify and apply thresholds to reduce noise. In the current operational example, the thresholds are applied to reduce noise in connection with the identification of one or more anomalies. For example, a threshold may comprise a predetermined number of anomalies to be identified before generating an alert. This threshold takes into account that applications may produce a given number of errors or anomalies during normal operation, and if the number of errors or anomalies does not exceed the threshold, it may not be necessary to alert an administrator or other user. In another example, a threshold may specify a maximum value for a metric of interest that, when exceeded, results in an anomaly, with no minimum value resulting in an anomaly, or a minimum value for a metric of interest that, when not met, results in an anomaly, with no maximum value resulting in an anomaly. With the use of only minimum or only maximum thresholds, unnecessary alerts corresponding to breaches of maximum or minimum thresholds that are not crucial can be avoided. According to an embodiment, the threshold criteria is specified by an administrator in an effort to reduce noisy alerts or is learned from analysis of feedback by one or more users via the monitoring and feedback engine 160.

According to an embodiment, the function performance layer 142 iteratively executes the relevant function in connection with the training dataset during model development until the function is adequately trained to perform the desired service (e.g., anomaly detection). For example, in the operational example, the function performance layer 142 detects anomalies based on the parameters of the training dataset for a given period of time. According to an embodiment, the training to execute the function (e.g., dynamic anomaly detection) is performed using one or more machine learning algorithms applying an unsupervised learning technique. An example of the machine learning algorithm is an isolation forest algorithm, which utilizes an ensemble regressor. This unsupervised learning technique uses multiple decision trees, where randomly sub-sampled data is processed in a tree structure based on randomly selected features. Deeper branches are less likely to be anomalies, while shorter branches may indicate anomalies. The isolation forest algorithm does not require labeled training data, and identifies anomalies among normal observations, by setting up threshold values in contamination parameters that can apply for real-time predictions. When presented with a dataset, the isolation forest algorithm splits the data into two parts based on a random threshold value. This process continues recursively until each data point is isolated. Once the algorithm runs through the whole data, the algorithm filters the data points which took fewer steps than others to be isolated. The isolation forest algorithm has the capacity to scale up to handle extremely large data sizes (e.g., terabytes) and high-dimensional problems with a large number of attributes, some of which may be irrelevant and potential noise. The isolation forest algorithm advantageously exhibits relatively low linear time-complexity and reduced memory requirements, while effectively addressing effects of swamping and masking. A masking effect is where a model predicts normal behavior when the behavior is anomalous. A swamping effect is where a model predicts anomalous behavior when the behavior is normal.

Other machine learning algorithms that may be trained and incorporated into the functions used for anomaly detection include, for example, k-nearest neighbor (KNN), support vector machine (SVM), density-based spatial clustering of applications with noise (DBSCAN), elliptic envelope, local outlier factor (LOF), Z-score and boxplot algorithms. KNN uses density-based distance measures for identifying unusual conditions and gradual trends, making KNN useful for outlier detection and defining suspicious events. A one-class SVM finds a hyperplane that separates a given dataset from an origin such that the hyperplane is as close to the datapoints as possible. DBSCAN is an unsupervised clustering-based algorithm, which splits data into distinct groups indicated by labels. Anomalies are found when a corresponding label holds the value of negative 1. The elliptic envelope algorithm is used when the data is in a Gaussian distribution. For example, the elliptic envelope algorithm converts the data into an elliptical shape and points which are far away from the shape coordinates are considered outliers and a minimum-covariance determinant is found. LOF is an anomaly detection algorithm based on a concept of local density, and uses the distance between the k-nearest neighbors to estimate density. The Z-score algorithm measures how far away a data point is from the mean as a signed multiple of the standard deviation. Large absolute values of the Z-score suggest an anomaly. Boxplot diagrams (also referred to as Whisker's plots) provide a graphical method typically depicted by quartiles and inter-quartiles, which are used to define the upper limit and lower limit beyond which any data points outside the limits will be considered as outliers.

After anomalies are identified during training, as described herein above, noisy alerts are reduced through: (i) identification of the type of anomalies that need to be identified (minimum or maximum threshold breaches or both); and (ii) identification of static threshold limits from SMEs' inputs to ensure alert criticality. The model development engine 140 outputs a deployment version of the relevant function to be used in an active pipeline.

Figure 2:
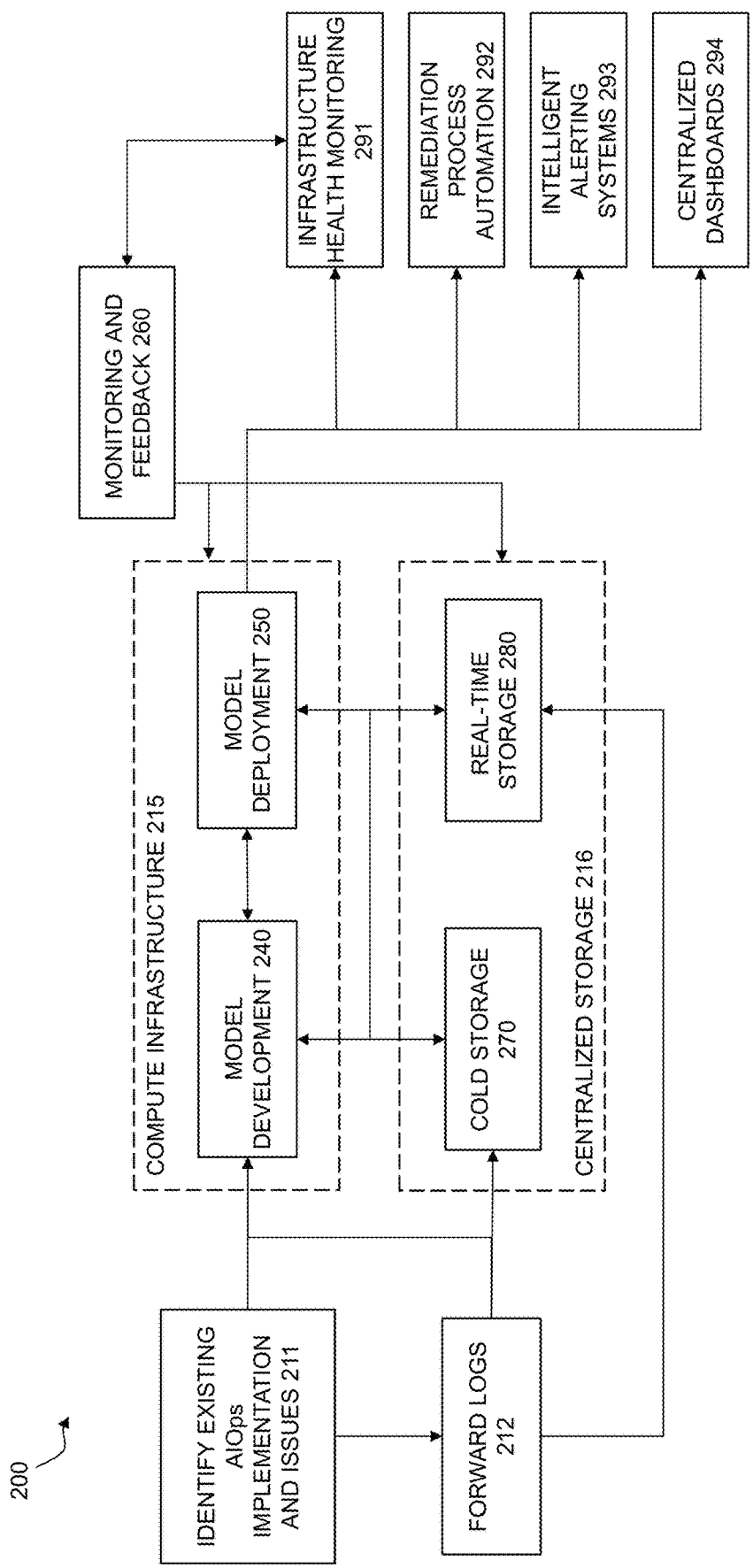
FIG. 2 depicts a system flow for management and deployment of codes as a service in an illustrative embodiment.

Following model development and training, the model deployment engine 150 applies the deployment version of the function to collected data to perform at least one service to solve one or more actual IT issues. In more detail, referring to FIG. 2, the system flow 200 includes a model development engine 240, a model deployment engine 250, a monitoring and feedback engine 260 and cold and real-time storage components 270 and 280 the same or similar to the model development engine 140, model deployment engine 150, monitoring and feedback engine 160 and cold and real-time storage components 170 and 180 of the information processing system 100. The model development and model deployment engines 240 and 250 are part of a compute infrastructure 215, and the cold and real-time storage components 270 and 280 are part of centralized storage 216. Referring to block 211, existing AIOps implementations and issues are identified. In other words, existing solutions and associated problems that require resolution are identified. At block 212, platform, device and/or application logs are forwarded to the compute infrastructure 215 and centralized storage 216. In more detail, the model development engine 240 (or 140) uses log data from cold storage 270 (or 170) to generate the training datasets. Following development of the deployment version of the codes as a service function, a pipeline activation layer (e.g., pipeline activation layer 151) of the model deployment engine 150/250 activates a pipeline so that log data corresponding to the real-time execution of platforms, devices and/or applications can be processed by the data receiving and parsing engine 120 and transmitted to the real-time storage component 180 for application to the deployment version of the ML-CaaS codes.

For example, referring to FIG. 3, pseudocode 300 corresponding to training and deployment of code in the ML-CaaS framework 110 illustrates importing from, for example, an ML-CaaS repository 130, of a required function that requires resolution. In the example in FIG. 3, the codes as a service correspond to missing data treatment (e.g., finding missing values of data) and dynamic anomaly detection. As shown in middle portion of FIG. 3, the training process as explained in connection with the model development engine 140/240 is run on the imported functions. Then, as further illustrated in the bottom portion of FIG. 3, a trained version of a given function (in this case, the function for detecting anomalies) is deployed for real-time analysis. The pseudocode 300 includes designations for the location of the data, name of the data and the version of the data.

Similar to the function performance layer 142, which executes the imported function during training, the model deployment engine 150 includes a function performance layer 152 which executes the deployment version of the function for deployment analysis (e.g., real-time analysis) of log data. Referring to FIG. 4, a report based on the application of the deployment version of the function is generated by, for example, a report generation layer 154, and sent to an administrator or other user via, for example, one of the administrator devices 106. The report 400 comprises an anomaly detection report detailing noted anomaly instances based on a breach of a maximum threshold. The report 400 illustrates a text version of a report that may appear on a user interface 108. Reports may also be in comma separated value (.csv) file format or appended to a database. As noted herein, depending on the function being applied, reports may correspond to different services.

Referring back to FIG. 2, depending on the results of the application of the deployment version of a function, certain processes may be triggered including, but not necessarily limited to, infrastructure health monitoring 291, automated remediation processes 292 to address any detected issues (e.g., detected anomalies, missing data values, etc.), and an intelligent alerting system 293 to provide alerts to necessary stakeholders (e.g., administrators, data scientists, SMEs, customers, etc.) about the discovered issues. Users, for example, through their user interfaces 108, may access one or more centralized dashboards 294 including summaries of the ML-CaaS functions and various results of analysis performed by the deployment versions of the functions. Feedback based on, for example, the monitored health of an IT infrastructure, the success of remediation processes and direct user feedback can be returned via the monitoring and feedback engine 160/260 to the model development and model deployment engines 140/240 and 150/250. The feedback can used, for example, during training of the imported functions to improve their operations by revising thresholds and/or metrics of interest.

Referring to FIGS. 1, 6A and 6B, the model deployment engine 150 further comprises an object file storage layer 153 to storage user parameter responses for future use. For example, the queries and user responses 600 in FIG. 6A given in connection with training are stored as, for example, object files for application of the parameters by the model deployment engine 150 to the deployment version of a given function. FIG. 6B depicts example pseudocode 610 for storage of the user responses such as, for example, "_time," "cpu_utilization_perc," "daily," "NA," "host," "Corr," "1," "max" and "75" for future reference as a part of ML-CaaS capabilities across all developed modules. The stored object files include, for example, user inputs for production automation, original dataset variable names to ensure future datasets extracted are not corrupt, PKL (Pickle) files, if any, to store model attributes or datasets for production automation, and outputs of the module in use (e.g., anomaly detection reports).

As an illustration of the results of application of one or more of the embodiments, FIG. 7 depicts example pseudocode 700 for storage reduction and the results of application of the pseudocode 700. Advantageously, in the example shown in FIG. 7, the ML-CaaS framework 110 reduces historical data storage requirements from 612.4 KB to 3.5 KB or by 99.4% by implementing less lines of code and using stored structured datasets for other machine learning experiments. For example, in some cases hundreds of lines of code may be provided as one line of code in an ML-CaaS framework.

According to one or more embodiments, the ML-CaaS repository 130, object file storage layer 153 and cold and real-time storage components 170/270 and 180/280, and other data repositories, storage components or databases referred to herein can be configured according to a relational database management system (RDBMS) (e.g., PostgreSQL). In some embodiments, the ML-CaaS repository 130, object file storage layer 153 and cold and real-time storage components 170/270 and 180/280, and other data repositories, storage components or databases referred to herein are implemented using one or more storage systems or devices associated with the ML-CaaS framework 110. In some embodiments, one or more of the storage systems utilized to implement the ML-CaaS repository 130, object file storage layer 153 and cold and real-time storage components 170/270 and 180/280, and other data repositories, storage components or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the ML-CaaS framework 110, the data receiving and parsing engine 120, ML-CaaS repository 130, model development engine 140, model deployment engine 150, monitoring and feedback engine 160, cold storage component 170 and real-time storage component 180 in other embodiments can be implemented at least in part externally to the ML-CaaS framework 110, for example, as stand-alone servers, sets of servers or other types of systems coupled to the network 104. For example, the data receiving and parsing engine 120, ML-CaaS repository 130, model development engine 140, model deployment engine 150, monitoring and feedback engine 160, cold storage component 170 and real-time storage component 180 may be provided as cloud services accessible by the ML-CaaS framework 110.

The data receiving and parsing engine 120, ML-CaaS repository 130, model development engine 140, model deployment engine 150, monitoring and feedback engine 160, cold storage component 170 and real-time storage component 180 in the FIG. 1 embodiment are each assumed to be implemented using at least one processing device. Each such processing device generally comprises at least one processor and an associated memory, and implements one or more functional modules for controlling certain features of the data receiving and parsing engine 120, ML-CaaS repository 130, model development engine 140, model deployment engine 150, monitoring and feedback engine 160, cold storage component 170 and/or real-time storage component 180.

At least portions of the ML-CaaS framework 110 and the elements thereof may be implemented at least in part in the form of software that is stored in memory and executed by a processor. The ML-CaaS framework 110 and the elements thereof comprise further hardware and software required for running the ML-CaaS framework 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data receiving and parsing engine 120, ML-CaaS repository 130, model development engine 140, model deployment engine 150, monitoring and feedback engine 160, cold storage component 170, real-time storage component 180 and other elements of the ML-CaaS framework 110 in the present embodiment are shown as part of the ML-CaaS framework 110, at least a portion of the data receiving and parsing engine 120, ML-CaaS repository 130, model development engine 140, model deployment engine 150, monitoring and feedback engine 160, cold storage component 170, real-time storage component 180 and other elements of the ML-CaaS framework 110 in other embodiments may be implemented on one or more other processing platforms that are accessible to the ML-CaaS framework 110 over one or more networks. Such elements can each be implemented at least in part within another system element or at least in part utilizing one or more stand-alone elements coupled to the network 104.

It is assumed that the ML-CaaS framework 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data receiving and parsing engine 120, ML-CaaS repository 130, model development engine 140, model deployment engine 150, monitoring and feedback engine 160, cold storage component 170, real-time storage component 180 and other elements of the ML-CaaS framework 110, and the elements thereof can each be implemented in the form of one or more LXCs running on one or more VMs. Other arrangements of one or more processing devices of a processing platform can be used to implement the data receiving and parsing engine 120, ML-CaaS repository 130, model development engine 140, model deployment engine 150, monitoring and feedback engine 160, cold storage component 170 and real-time storage component 180, as well as other elements of the ML-CaaS framework 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the ML-CaaS framework 110 to reside in different data centers. Numerous other distributed implementations of the ML-CaaS framework 110 are possible.

Accordingly, one or each of the data receiving and parsing engine 120, ML-CaaS repository 130, model development engine 140, model deployment engine 150, monitoring and feedback engine 160, cold storage component 170, real-time storage component 180 and other elements of the ML-CaaS framework 110 can each be implemented in a distributed manner so as to comprise a plurality of distributed elements implemented on respective ones of a plurality of compute nodes of the ML-CaaS framework 110.

It is to be appreciated that these and other features of illustrative embodiments are presented by way of example only, and should not be construed as limiting in any way. Accordingly, different numbers, types and arrangements of system elements such as the data receiving and parsing engine 120, ML-CaaS repository 130, model development engine 140, model deployment engine 150, monitoring and feedback engine 160, cold storage component 170, real-time storage component 180 and other elements of the ML-CaaS framework 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the ML-CaaS framework can be offered to cloud infrastructure customers or other users as part of FaaS and/or PaaS offerings.

The operation of the information processing system 100 will now be described in further detail with reference to the flow diagram of FIG. 8. With reference to FIG. 8, a process 800 for codes as a service management and deployment as shown includes steps 802 through 810, and is suitable for use in the system 100 but is more generally applicable to other types of information processing systems comprising an ML-CaaS framework configured for codes as a service management and deployment.

In step 802, data corresponding to execution of one or more applications is received. The data is received in an unstructured format, and is converted to a structured format. In one or more embodiments, the data comprises log data, and the converting of the data to the structured format comprises grouping the log data according to one or more time intervals.

In step 804, at least one function is accessed from a codes as a service source. In step 806, the at least one function is trained based, at least in part, on one or more parameters, wherein the training is performed using a first portion of the data. A user interface is provided for a user to specify the one or more parameters. In an embodiment, a parameter comprises a metric of interest associated with identification of one or more anomalies in connection with the execution of the one or more applications. The training of the at least one function comprises applying at least one threshold to reduce noise in connection with the identification of the one or more anomalies, wherein the at least one threshold comprises a predetermined number of anomalies to be identified before generating an alert. In an embodiment, the at least one threshold specifies one of: (i) a maximum value that, when exceeded, results in an anomaly, with no minimum value resulting in an anomaly; and (ii) a minimum value that, when not met, results in an anomaly, with no maximum value resulting in an anomaly.

The one or more parameters may comprise a time period associated with the first portion of the data. In accordance with an embodiment, the training is performed using one or more machine learning algorithms applying an unsupervised learning technique, wherein the one or more machine learning algorithms comprise an isolation forest algorithm.

In step 808, a deployment version of the at least one function is generated based, at least in part, on the training. In step 810, the deployment version of the at least one function is applied to a second portion of the data to perform at least one service. The second portion of the data can correspond to real-time execution of the one or more applications. The at least one service comprises one or more of dynamic anomaly detection, missing data treatment, numeric variables treatment, object variables treatment, text data preparation, principal component analysis implementation, data clustering and data classification.

In an embodiment, a report corresponding to the application of the deployment version of the at least one function is generated and routed to at least one user. One or more files corresponding to the one or more parameters are stored for application of the one or more parameters to the deployment version of the at least one function.

It is to be appreciated that the FIG. 8 process and other features and functionality described above can be adapted for use with other types of information systems configured to execute codes as a service management and deployment services in an ML-CaaS framework or other type of platform.

The particular processing operations and other system functionality described in conjunction with the flow diagram of FIG. 8 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an ML-CaaS framework as disclosed herein can provide a number of significant advantages relative to conventional arrangements. For example, the ML-CaaS framework uses machine learning to dynamically detect anomalies and perform other services in connection with optimum machine learning experimentation across varied algorithms and methodologies. In more detail, AIOps enables automated IT support operations and/or processes. However, alerts through static thresholding are often ineffective and noisy, and silo-based analysis of anomalous behavior in various application and platform logs results in a high volume unstructured logs, which are unnecessarily stored for long term periods.

To address these concerns, the embodiments implement dynamic anomaly detection as part of a ML-CaaS framework. According to one or more embodiments, an AIOps framework for optimum experimentation and seamless production deployment provides an automated data science pipeline capable of: (i) determining data-driven decision making capability for IT operations; (ii) implementing centralized data warehousing and indexing capabilities for involved information; (iii) providing machine learning codes for ML-CaaS in connection with AIOps pipeline development; (iv) providing an automated deployment and maintenance pipeline for instant usage of AIOps solutions; and (v) providing a ready-to-use AIOps infrastructure as a service (IaaS) through a machine learning driven feedback model.

The embodiments advantageously reduce historical data storage requirements and provide significant savings in terms of storage and time by storing high volume unstructured logs only during a data manipulation lifecycle and curating low-volume structured datasets for longer-term storage. As an additional advantage, the embodiments prevent or reduce noisy alerts through the implementation of thresholds.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the ML-CaaS framework 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an ML-CaaS framework in illustrative embodiments. These and other cloud-based systems in illustrative embodiments can include object stores.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
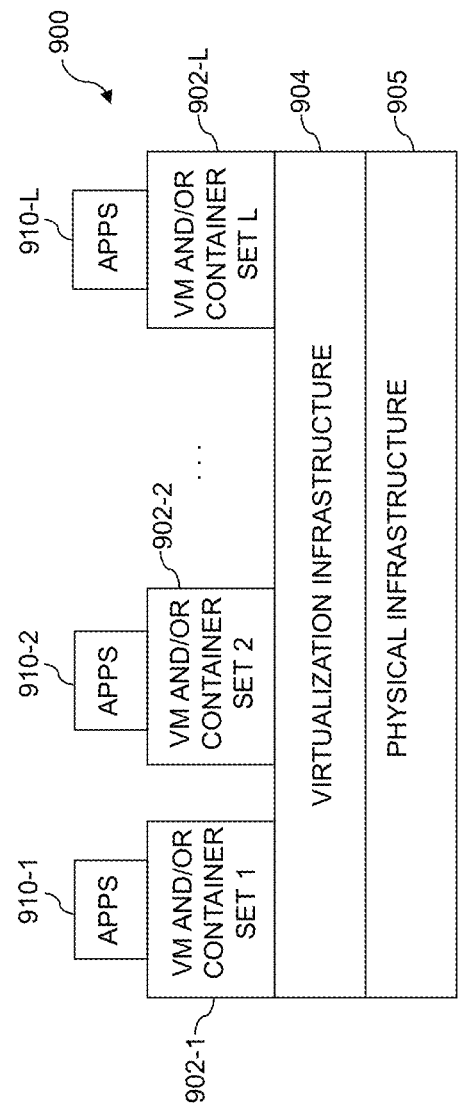
FIGS. 9 and 10 show examples of processing platforms that may be utilized to implement at least a portion of an information processing system according to illustrative embodiments.
Figure 10:
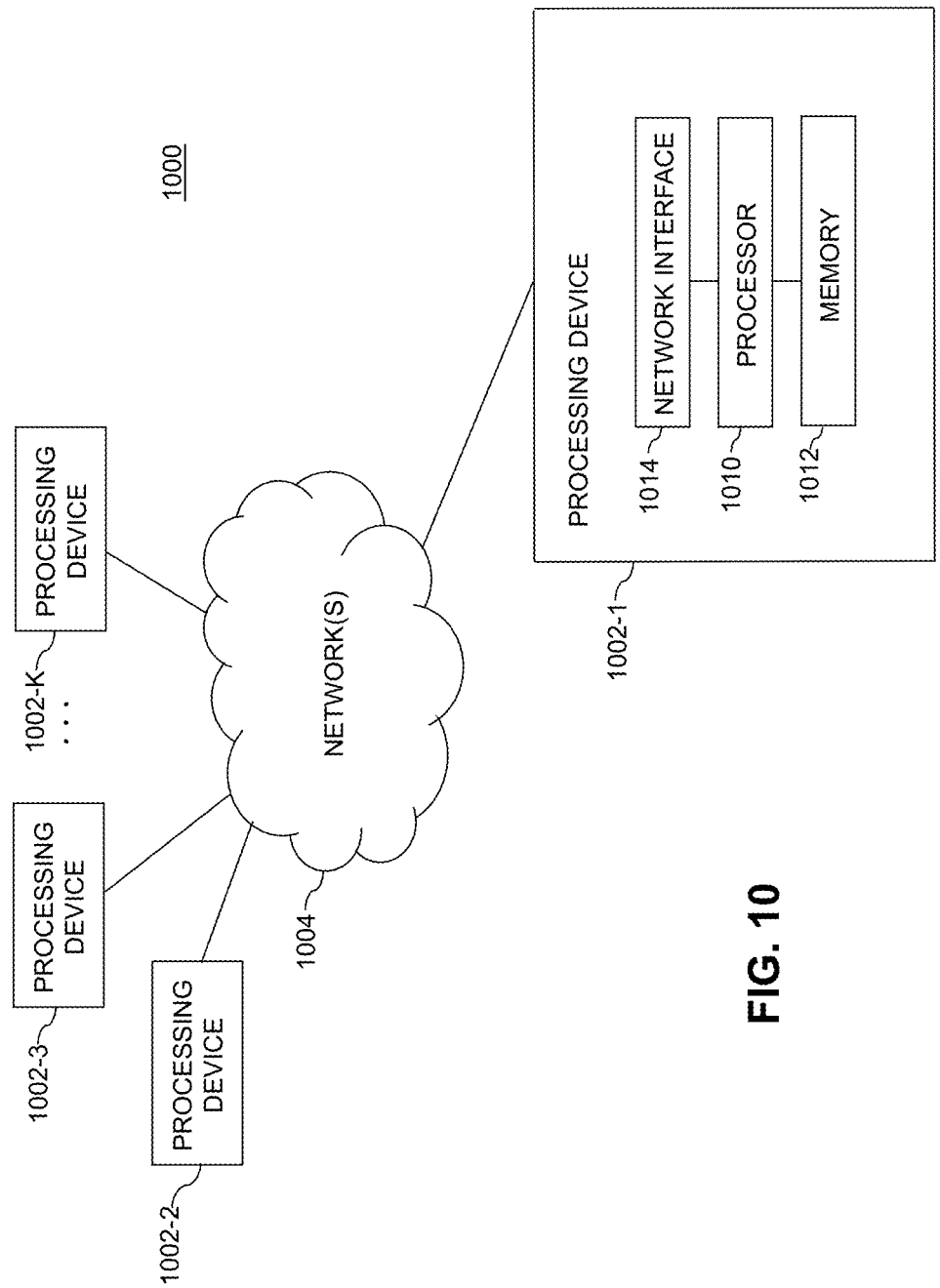

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012. The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the ML-CaaS framework 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and ML-CaaS frameworks. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
receiving data corresponding to execution of one or more applications;
accessing at least one function from a codes as a service source;
training the at least one function based, at least in part, on one or more parameters, wherein the training is performed using a first portion of the data;
generating a deployment version of the at least one function based, at least in part, on the training; and
applying the deployment version of the at least one function to a second portion of the data to perform at least one service;
wherein the steps of the method are executed by a processing device operatively coupled to a memory.

2. The method of claim 1, wherein the data is received in an unstructured format, and the method further comprises converting the data to a structured format.

3. The method of claim 2, wherein:
the data comprises log data; and
the converting comprises grouping the log data according to one or more time intervals.

4. The method of claim 1, wherein the one or more parameters comprises a metric of interest associated with identification of one or more anomalies in connection with the execution of the one or more applications.

5. The method of claim 4, wherein training the at least one function comprises applying at least one threshold to reduce noise in connection with the identification of the one or more anomalies.

6. The method of claim 5, wherein the at least one threshold comprises a predetermined number of anomalies to be identified before generating an alert.

7. The method of claim 5, wherein the at least one threshold specifies one of: (i) a maximum value that, when exceeded, results in an anomaly, with no minimum value resulting in an anomaly; and (ii) a minimum value that, when not met, results in an anomaly, with no maximum value resulting in an anomaly.

8. The method of claim 1, wherein the one or more parameters comprises a time period associated with the first portion of the data.

9. The method of claim 1, wherein the training is performed using one or more machine learning algorithms applying an unsupervised learning technique.

10. The method of claim 9, wherein the one or more machine learning algorithms comprise an isolation forest algorithm.

11. The method of claim 1, further comprising:
generating a report corresponding to the application of the deployment version of the at least one function; and
routing the report to at least one user.

12. The method of claim 1, wherein the second portion of the data corresponds to real-time execution of the one or more applications.

13. The method of claim 1, further comprising storing one or more files corresponding to the one or more parameters for application of the one or more parameters to the deployment version of the at least one function.

14. The method of claim 1, further comprising providing at least one user interface for a user to specify the one or more parameters.

15. The method of claim 1, wherein the at least one service comprises one or more of dynamic anomaly detection, missing data treatment, numeric variables treatment, object variables treatment, text data preparation, principal component analysis implementation, data clustering and data classification.

16. An apparatus comprising:
a processing device operatively coupled to a memory and configured to:
receive data corresponding to execution of one or more applications;
access at least one function from a codes as a service source;
train the at least one function based, at least in part, on one or more parameters, wherein the training is performed using a first portion of the data;
generate a deployment version of the at least one function based, at least in part, on the training; and
apply the deployment version of the at least one function to a second portion of the data to perform at least one service.

17. The apparatus of claim 16, wherein the one or more parameters comprises a metric of interest associated with identification of one or more anomalies in connection with the execution of the one or more applications.

18. The apparatus of claim 17, wherein, in training the at least one function, the processing device is configured to apply at least one threshold to reduce noise in connection with the identification of the one or more anomalies.

19. An article of manufacture comprising a non-transitory processor-readable storage medium having stored therein program code of one or more software programs, wherein the program code when executed by at least one processing device causes said at least one processing device to perform the steps of:
receiving data corresponding to execution of one or more applications;
accessing at least one function from a codes as a service source;
training the at least one function based, at least in part, on one or more parameters, wherein the training is performed using a first portion of the data;
generating a deployment version of the at least one function based, at least in part, on the training; and
applying the deployment version of the at least one function to a second portion of the data to perform at least one service.

20. The article of manufacture of claim 19, wherein the one or more parameters comprises a metric of interest associated with identification of one or more anomalies in connection with the execution of the one or more applications.

* * * * *